United States Patent [19]

Brückner et al.

[11] Patent Number: 5,251,432

[45] Date of Patent: Oct. 12, 1993

[54] METHOD FOR OPERATING A GAS AND STEAM TURBINE PLANT

[75] Inventors: Hermann Brückner, Uttenreuth; Werner Emsperger, Erlangen, both of Fed. Rep. of Germany

[73] Assignee: Siemens Aktiengesellschaft, Munich, Fed. Rep. of Germany

[21] Appl. No.: 916,033

[22] Filed: Jul. 17, 1992

[30] Foreign Application Priority Data

Jul. 17, 1991 [DE] Fed. Rep. of Germany ....... 4123730

[51] Int. Cl.$^5$ .............................................. F02C 6/00
[52] U.S. Cl. .................................. 60/39.02; 60/39.182
[58] Field of Search ............... 60/39.02, 39.12, 39.182, 60/39.464, 39.465

[56] References Cited

U.S. PATENT DOCUMENTS

| | | | |
|---|---|---|---|
| 2,675,672 | 4/1954 | Schorner | 60/39.182 |
| 3,873,845 | 3/1975 | Osthaus | 60/39.12 |
| 4,261,166 | 4/1981 | Mayrhofer | 60/39.02 |
| 4,288,979 | 9/1981 | Liljedahl et al. | 60/39.12 |
| 4,424,668 | 1/1984 | Mukherjec | 60/39.182 |
| 4,468,923 | 9/1984 | Jorzyk et al. | 60/39.02 |
| 4,693,072 | 9/1987 | McLean et al. | 60/39.02 |
| 4,729,217 | 3/1988 | Kehlhofer | 60/39.02 |
| 5,044,163 | 9/1991 | Bruckner et al. | 60/39.182 |
| 5,079,909 | 1/1992 | Bruckner et al. | 60/39.12 |

FOREIGN PATENT DOCUMENTS

| | | |
|---|---|---|
| 0410111 | 1/1991 | European Pat. Off. . |
| 0211511 | 12/1983 | Japan ..................... 60/39.12 |

*Primary Examiner*—Richard A. Bertsch
*Assistant Examiner*—Michael I. Kocharov
*Attorney, Agent, or Firm*—Herbert L. Lerner; Laurence A. Greenberg

[57] ABSTRACT

A gas and steam turbine plant includes a steam turbine having a water-steam loop. A waste heat boiler which is connected downstream of a gas turbine includes a high-pressure preheater connected in the water-steam loop, a high-pressure heater connected downstream of the high-pressure preheater, a low-pressure heater connected upstream of the high-pressure preheater, and an evaporator of a medium-pressure heater. A coal gasification plant is connected upstream of the gas turbine. An outflow line leads into the coal gasification plant and is connected to the water-steam loop downstream of the high-pressure preheater, as seen in water flow direction. A water-steam drum communicates with the outflow line and is connected to the evaporator. A method for operating the plant includes generating steam for the steam turbine with working fluid expanded in the gas turbine. A partial quantity of preheated water at high pressure is drawn from the water-steam loop of the steam turbine and cools coal gas, when coal gas is used as fuel for the gas turbine. The drawn partial quantity is expanded and steam being formed in the process is superheated at medium pressure, both in partial-load operation and when natural gas is used as fuel for the gas turbine. Water remaining in the expansion is evaporated at medium pressure.

10 Claims, 1 Drawing Sheet

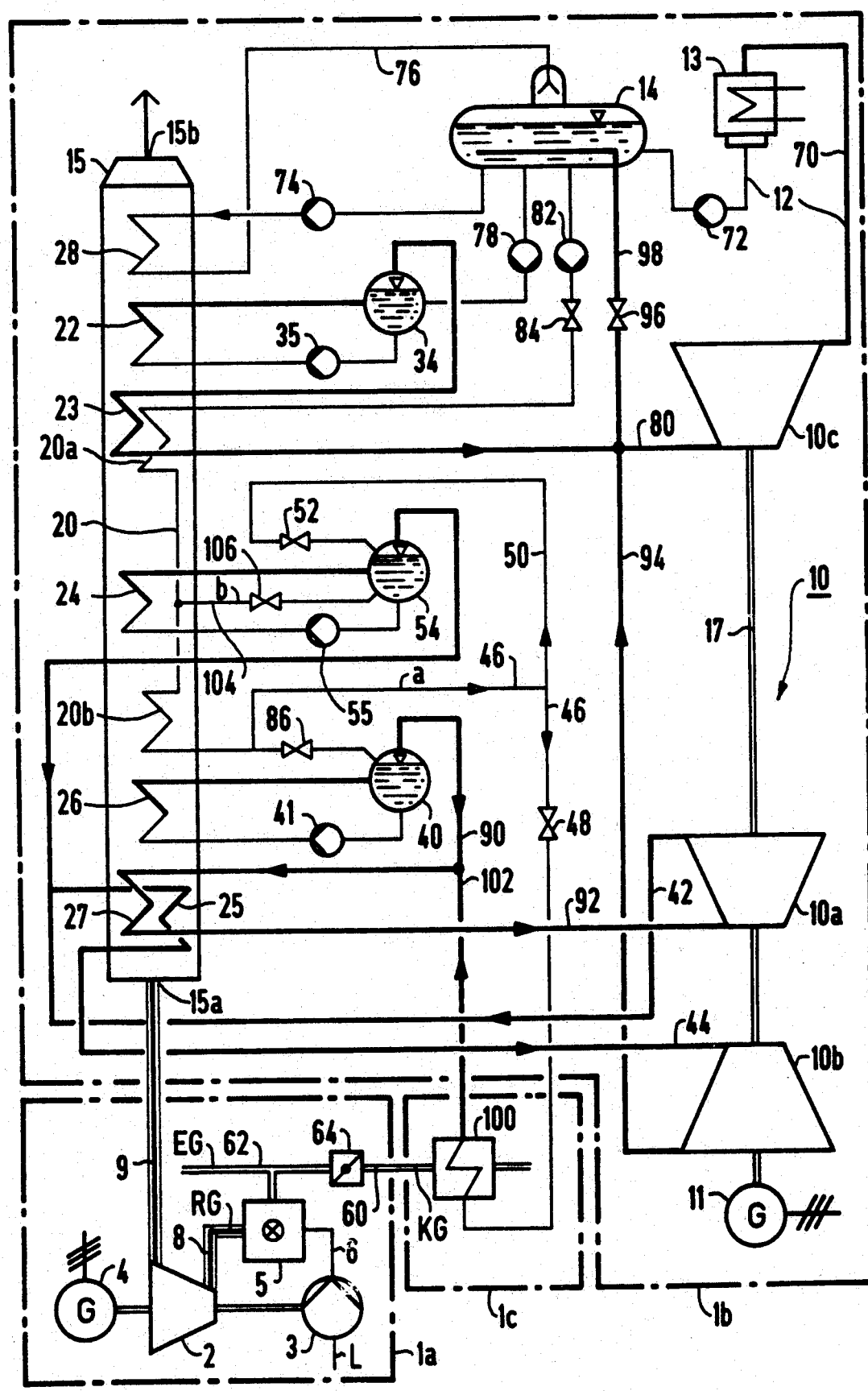

METHOD FOR OPERATING A GAS AND STEAM TURBINE PLANT

The invention relates to a method for operating a gas and steam turbine plant, in which a working fluid expanded in a gas turbine is used to generate steam for a steam turbine, and when coal gas is used as fuel for the gas turbine, some of the preheated water, which is also at high pressure, is drawn from the water-steam loop of the steam turbine and used for cooling the coal gas. The invention is also directed to a gas and steam turbine plant operating according to the method.

In a gas and steam turbine plant, heat contained in exhaust gas from the gas turbine is utilized in a waste heat boiler to generate steam for the steam turbine. The water-steam loop of the steam turbine includes at least two pressure stages, each being made up of a preheater as well as an evaporator and a superheater. In a plant with a coal gasifier connected upstream of the gas turbine, preheated water is drawn from the water-steam loop for cooling crude gas generated in the coal gasification. The heat thus recovered is also used to generate steam for the steam turbine.

In partial-load operation of such a plant, a fresh steam quantity that is generated decreases disproportionately to the thermal output contained in the exhaust gas from the gas turbine, which is available for preheating the feedwater. That is particularly true when natural gas is used as fuel for the gas turbine, or in other words in natural gas operation, because then the feedwater quantity and accordingly the fresh steam quantity as well are reduced by the proportion of water drawn from the water-steam loop for coal gasification in coal gas operation. The danger exists both in partial-load operation and in natural gas operation that the disproportionately high amount of available heat in the waste heat boiler will lead to evaporation, particularly in the high-pressure preheater or economizer. Corrosion damage to the heating surfaces of the preheater can occur as a result. Moreover, the temperature of the exhaust gas leaving the waste heat boiler rises to extremely high values, so that the overall efficiency of the plant is limited.

It is accordingly an object of the invention to provide a method for operating a gas and steam turbine plant and a plant for performing the method, which overcome the hereinafore-mentioned disadvantages of the heretofore-known methods and devices of this general type and which do so in such a way that regardless of the fuel being used, the highest possible overall efficiency is attained under all operating conditions, including natural gas operation or partial-load operation, while thermodynamic losses are avoided.

With the foregoing and other objects in view there is provided, in accordance with the invention, a method for operating a gas and steam turbine plant having a gas turbine and a steam turbine with a water-steam loop, which comprises generating steam for the steam turbine with working fluid expanded in the gas turbine; drawing a partial quantity of preheated water at high pressure from the water-steam loop of the steam turbine and cooling coal gas with the partial quantity, when coal gas is used as fuel for the gas turbine; expanding the drawn partial quantity and superheating steam being formed in the process at medium pressure, both in partial-load operation and when natural gas is used as fuel for the gas turbine; and evaporating water remaining in the expansion at medium pressure.

The steam is suitably superheated at medium pressure, along with the steam formed in the expansion, and delivered in the superheated state to a medium-pressure part of the steam turbine.

Published European Application No. 0 410 111 discloses a gas and steam turbine plant in which the steam for the steam turbine is generated in a high-pressure stage and in a low-pressure stage of the water-steam loop. In partial-load operation, the water quantity flowing through the heating surfaces of the high-pressure preheater or economizer is increased to such an extent that no evaporation can occur there. A partial quantity of the feedwater, which is at high pressure and preheated and is not needed for steam generation, is first expanded to medium pressure in a first expansion stage, and the steam thus formed is superheated at medium pressure. The water remaining in the expansion is expanded to low pressure in a second expansion stage, and the steam thus formed is superheated at low pressure. The water remaining in the second expansion is returned to a feedwater container integrated into the water-steam loop. However, thermodynamic losses occur in each expansion stage.

In accordance with another mode of the invention, there is provided a method which comprises drawing a further partial quantity of the preheated water, which is at high pressure, from the water-steam loop and evaporating it at the medium pressure. In this process, advantageously all of the water evaporated at medium pressure is superheated with steam flowing out of a high-pressure part of the steam turbine.

In accordance with a further mode of the invention, there is provided a method which comprises superheating the water evaporated at medium pressure along with the steam formed in the expansion, and delivering the water and the steam to a medium-pressure part of the steam turbine.

In accordance with an added mode of the invention, there is provided a method which comprises superheating the steam at medium pressure along with steam flowing out of a high-pressure part of the steam turbine.

In accordance with an additional mode of the invention, there is provided a method which comprises drawing a maximum of 60% of the pre-heated water, at high pressure, from the water-steam loop, in order to cool the coal gas.

With the objects of the invention in view, there is also provided a gas and steam turbine plant, comprising a steam turbine having a water-steam loop; a gas turbine; a waste heat boiler connected downstream of said gas turbine, said waste heat boiler including a high-pressure preheater connected in said water-steam loop, a high-pressure heater connected downstream of said high-pressure preheater, a low-pressure heater connected upstream of said high-pressure preheater, and an evaporator of a medium-pressure heater; a coal gasification plant connected upstream of said gas turbine; an outflow line leading into said coal gasification plant and being connected to said water-steam loop downstream of said high-pressure preheater, as seen in water flow direction; and a water-steam drum communicating with said outflow line and being connected to said evaporator.

In accordance with another feature of tee invention, there is provided a valve connected between said outflow line and said water-steam drum.

In accordance with a further feature of the invention, the steam turbine has a medium-pressure part, and said waste heat boiler has an intermediate superheater connected between said water-steam drum and said medium-pressure part.

In accordance with an added feature of the invention, the high-pressure preheater has two series-connected heating surfaces.

In accordance with an additional feature of the invention, the evaporator in said waste heat boiler is disposed between said heating surfaces of said high-pressure preheater.

In accordance with a concomitant feature of the invention, the water-steam drum is connected to said water-steam loop between said heating surfaces of said high-pressure preheater. This is done in order to adjust the quantity of water in the water-steam drum.

The advantages attained with the invention ar in particular that, regardless of the fuel used for the gas turbine, an adequate water throughput in all load ranges through the high-pressure preheater or economizer is assured, so that evaporation there is reliably avoided. When natural gas is used, as well as in partial-load operation, only slight thermodynamic losses occur in only one expansion stage drawn from the expansion of the partial quantity of water drawn from the economizer.

Other features which are considered as characteristic for the invention are set forth in the appended claims.

Although the invention is illustrated and described herein as embodied in a method for operating a gas and steam turbine plant and a plant for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a schematic circuit diagram of a gas and steam turbine plant, with a water-steam loop of the steam turbine being made up of three pressure stages.

Referring now to the figures of the drawing in detail and first, particularly, to FIG. 1 thereof, there is seen a gas and steam turbine plant which includes a gas turbine plant 1a and a steam turbine plant 1b. The gas turbine plant 1a is connected downstream of a coal gasification plant 1c. The gas turbine plant 1a includes a gas turbine 2 with an air compressor 3 coupled thereto and a generator 4 as well as a combustion chamber 5 being connected upstream of the gas turbine 2 and being connected to a fresh air line 6 of the air compressor 3.

The steam turbine plant 1b includes a steam turbine 10 with a generator 11 coupled thereto, and a water-steam loop 12 including a condenser 13 being connected downstream of the steam turbine 10 and a feedwater container 14 being connected downstream of the condenser 13, as well as a waste heat boiler 15.

The steam turbine 10 includes a high-pressure part 10a, a medium-pressure part 10b and a low-pressure part 10c, which drives the generator 11 through a common shaft 17.

In order to supply exhaust gases AG from the gas turbine 2 to the waste heat boiler 15, an exhaust gas line 9 is connected to one inlet 15a of the waste heat boiler 15. The exhaust gas AG leaves the waste heat boiler 15 through an outlet 15b in the direction of a non-illustrated chimney.

The waste heat boiler 15 includes a high-pressure preheater or economizer 20, which is made up of two series-connected heating surfaces 20a and 20b; a low-pressure heater 22, 23; a medium-pressure heater 24, 25; and a high-pressure heater 26, 27.

The low-pressure heater 22, 23 includes an evaporator 22 and a superheater 23, which together with the low-pressure part 10c of the steam turbine 10 and with a preheater 28 and a water-steam drum 34 form a low-pressure stage of the water-steam loop 12.

The high-pressure heater 26, 27 includes an evaporator 26 and a superheater 27, which together with the high-pressure part 10a of the steam turbine 10 and with the economizer 20 and a water-steam drum 40 form a high-pressure stage of the water-steam loop 12.

The medium-pressure heater 24, 25 includes an evaporator 24 and an intermediate superheater 25, which is connected on the input side to the high-pressure part 10a through a steam line 42 and on the output side to the medium-pressure part 10b of the steam turbine 10 through a steam line 44. The evaporator 24 is disposed in the waste heat boiler 15 in a region between the heating surfaces 20a and 20b of the high-pressure preheater 20. The medium-pressure heater 24, 25, together with the medium-pressure part 10b of the steam turbine 10 and a water-steam drum 54, form a medium-pressure stage of the water-steam loop 12.

An outflow line 46, which leads into the coal gasification plant 1c through a valve 48, is connected to the water-steam loop 12 downstream of the heating surfaces 20b of the economizer 20, as seen in the flow direction of the water. A compensation line 50 which discharges into the water-steam drum 54 through a valve 52, is connected to the outflow line 46.

When the gas and steam turbine plant is in operation, the combustion chamber 5 is selectively supplied with fuel in the form of coal gas KG from the coal gasification plant 1c through a supply line 60, or in the form of natural gas EG through a supply line 62. Upon a transition from natural gas operation to coal gas operation, a flap 64 is actuated, which is located in the supply line 60 in the exemplary embodiment.

The fuel KG or EG is combusted in the combustion chamber 5 along with compressed fresh air L from the air compressor 3. Hot flue gas RG produced in the combustion serves as working fluid and is carried into the gas turbine 2 through a flue gas line 8. There it expands, and in so doing drives the gas turbine 2. The turbine 2 in turn drives the air compressor 3 and the generator 4. The hot exhaust gas AG leaving the gas turbine 2 is carried through the exhaust gas line 9 into the waste heat boiler 15, where it is used to generate steam for the steam turbine 10. The steam emerging from the low-pressure part 10c of the steam turbine 10 is delivered through a steam line 70 to the condenser 13, where it condenses. Condensate is pumped into the feedwater container 14 by a condensate pump 72. Water is pumped by a circulation pump 74 from the feedwater container 14 into the preheater 28 and is preheated there. The water that is preheated in the preheater 28 flows back into the feedwater container 14 through a line 76. Preheated water is pumped out of the feedwater container 14 and into the water-steam drum 34 by a low-pressure pump 78. There the water is evaporated with the aid of the evaporator 22. To that end, with the aid of a pump 35, water is pumped out of the water-steam drum 34 into the evaporator 22 and from there back into the water steam drum 34. Steam that is separated out in the water-steam drum 34 is delivered to the superheater 23 and from there flows, in the superheated state, through a steam line 80, into the low-pressure part 10c of the steam turbine 10.

The water from the feedwater container 14 that is supplied to the high-pressure stage is first pumped through a high-pressure pump 82 and a valve 84, into the high-pressure preheater or economizer 20 and heated there. The water that is heated in the heating surfaces 20a and 20b of the economizer 20 flows through a valve 86 into the water-steam drum 40. There the water is evaporated with the aid of the evaporator 26.

Water from the water-steam drum 40 is pumped by a pump 41 into the evaporator 26 and from there back into the water-steam drum 40. The steam formed in the water-steam drum 40 flows through a line 90 into the superheater 27 and from there it flows, in the superheated state, through a steam line 92 into the high-pressure part 10a of the steam turbine 10. The steam which is expanded in the high-pressure part 10a flows through the steam line 42 into the intermediate superheater 25 and from there into the medium-pressure part 10b of the steam turbine 10. The steam which is expanded in the medium-pressure part 10b of the steam turbine 10 flows through a steam line 94, which is connected to the steam line 80, into the low-pressure part 10c of the steam turbine 10 along with the steam from the superheater 23. Some of the steam flowing out of the medium-pressure part 10b of the steam turbine 10 flows into the feedwater container 14 through a steam line 98, when a valve 96 is open.

In coal gas operation, in other words when coal gas KG is used as fuel for the steam turbine 2, a partial quantity a of the preheated water, which is adjustable with the valve 48 and is at high pressure, is drawn from the water steam loop 12 downstream of the heating surfaces 20b of the economizer 20 and delivered to the coal gasification plant through the outflow line 46. The partial quantity a is dependent on the gasifier type being used in the coal gasification plant, among other factors, and amounts to up to 60% of the quantity of water flowing through the economizer. In the coal gasification plant 1c, the preheated water is evaporated in a heat exchanger 100 by indirect heat exchange with the crude gas or coal gas KG produced in the coal gasification process. The coal gas KG is cooled down simultaneously with this evaporation. The steam formed in the process flows through a steam line 102, out of the coal gasification plant 1c and into the superheater 27 of the high-pressure stage.

In partial-load operation or in natural gas operation, in other words when natural gas EG is used as fuel for the gas turbine 2, the partial quantity a of the preheated water, which is at high pressure, that is not needed for the steam generation, flows into the water-steam drum 54 through the compensation line 50. The preheated water is first expanded to a medium pressure and the water remaining in the process is evaporated at this same medium pressure in the evaporator 24. To this end, water is pumped by means of a pump 55 out of the water-steam drum 54 and into the evaporator 24 and from there back into the water-steam drum 54. Next, this steam, along with the steam formed in the expansion and the steam flowing out of the high-pressure part 10a of the steam turbine 10 through the steam line 42, is superheated in the intermediate superheater 25. The superheated steam is supplied to the medium-pressure part 10b of the steam turbine 10 through the steam line 44.

In order to regulate the quantity of water in the water-steam drum 54 and to adjust the steam flowing through the medium-pressure stage, a further adjustable partial quantity b of the preheated water is drawn from the water-steam loop 12. To this end, a line 104 having a valve 106 and communicating with the water steam drum 54, is connected to the economizer 20 in the region between its heating surfaces 20a and 20b.

The operating range required for expanding the water, which was preheated in the economizer 20 and is at high pressure, is extremely limited, so that the thermodynamic losses are slight. Moreover, because of the evaporation of the water collected in the water-steam drum 54 and the superheating of the thus-formed steam in the medium-pressure heating surfaces 24 and 25, the thermal output of the exhaust gases AG from the gas turbine 2 is optimally used for the steam generation in all load ranges, regardless of the fuel being used. Simultaneously, the temperature of the exhaust gases AG leaving the waste heat boiler 15 is lowered to extremely low values, so that the overall efficiency of the plant 1 is especially high.

We claim:

1. A method for operating a gas and steam turbine plant having a gas turbine and a steam turbine with a water-steam loop, whereby the gas turbine is selectively fueled with coal gas or natural gas, which comprises:
   generating steam for the steam turbine with working fluid expanded in the gas turbine;
   drawing a partial quantity of preheated water at high pressure from the water-steam loop of the steam turbine;
   when coal gas is used as fuel for the gas turbine, cooling the coal gas with the partial quantity for forming steam for the steam turbine;
   when natural gas is used as fuel for the gas turbine, expanding the drawn partial quantity and forming medium pressure steam, and superheating the medium pressure steam at medium pressure for forming superheated steam;
   recycling the superheated steam to the water-steam loop of the steam turbine; and
   evaporating water remaining in the expanding step at medium pressure for forming additional steam at medium pressure.

2. The method according to claim 1, which comprises drawing a further partial quantity of preheated water at high pressure from the water-steam loop and evaporating the further partial quantity at medium pressure for superheating and delivering to a medium-pressure stage of the steam turbine.

3. The method according to claim 1, which comprises drawing up to 60% of the preheated water at high pressure from the water-steam loop.

4. The method according to claim 1, which comprises superheating the additional steam at medium pressure along with the medium pressure steam formed in the expanding step, and delivering the additional steam and the medium pressure steam to a medium-pressure stage of the steam turbine.

5. The method according to claim 4, which comprises superheating the medium pressure steam and the additional steam at medium pressure along with steam flowing out of a high-pressure stage of the steam turbine.

6. A method for operating a gas and steam turbine plant having a gas turbine fueled with coal gas and a steam turbine with a water-steam loop, which comprises:

generating steam for the steam turbine with working fluid expanded in the gas turbine;

drawing a partial quantity of preheated water at high pressure from the water-steam loop of the steam turbine and cooling the coal gas with the partial quantity for forming steam for the steam turbine;

in partial load operation, expanding the drawn partial quantity and forming medium pressure steam, superheating the medium pressure steam at medium pressure for forming superheated steam;

recycling the superheated steam to the water-steam loop of the steam turbine; and evaporating water remaining in the expanding step at medium pressure for forming additional steam at medium pressure.

7. The method according to claim 6, which comprises superheating the additional steam at medium pressure along with the medium pressure steam formed in the expanding step, and delivering the additional steam and the medium pressure steam to a medium-pressure stage of the steam turbine.

8. The method according to claim 6, which comprises drawing up to 60% of the preheated water at high pressure from the water-steam loop.

9. The method according to claim 6, which comprises drawing a further partial quantity of preheated water at high pressure from the water-steam loop and evaporating the further partial quantity at medium pressure for superheating and delivering to a medium-pressure stage of the steam turbine.

10. The method according to claim 9, which comprises superheating the medium pressure steam and the additional steam at medium pressure along with steam flowing out of a high-pressure stage of the steam turbine.

* * * * *